(12) United States Patent
Hong

(10) Patent No.: US 11,120,325 B1
(45) Date of Patent: Sep. 14, 2021

(54) READER AND DATA READING DEVICE

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 17/029,413

(22) Filed: Sep. 23, 2020

(51) Int. Cl.
| | |
|---|---|
| G06K 7/08 | (2006.01) |
| G06K 19/06 | (2006.01) |
| G06K 7/06 | (2006.01) |
| G06K 19/14 | (2006.01) |
| G06K 7/00 | (2006.01) |
| G06K 7/10 | (2006.01) |

(52) U.S. Cl.
CPC ......... G06K 19/145 (2013.01); G06K 7/0056 (2013.01); G06K 7/10376 (2013.01)

(58) Field of Classification Search
USPC .......................... 235/383, 385, 441, 451, 492
See application file for complete search history.

(56) References Cited

U.S. PATENT DOCUMENTS

| | | | | |
|---|---|---|---|---|
| 10,569,958 | B1* | 2/2020 | Ichinose | ................ B65D 85/20 |
| 2006/0283945 | A1* | 12/2006 | Excoffier | .............. B01L 3/5457 |
| | | | | 235/439 |
| 2011/0147467 | A1* | 6/2011 | Choi | ........................ H01Q 9/24 |
| | | | | 235/492 |
| 2012/0280103 | A1* | 11/2012 | Forster | ................... B31D 1/025 |
| | | | | 248/342 |
| 2013/0113627 | A1* | 5/2013 | Tiedmann | .......... G08B 13/2448 |
| | | | | 340/572.1 |
| 2013/0233924 | A1 | 9/2013 | Burns | |
| 2014/0128832 | A1* | 5/2014 | Larson | ...................... A61J 1/18 |
| | | | | 604/404 |
| 2015/0235120 | A1* | 8/2015 | Warren | .................. A44C 15/00 |
| | | | | 235/439 |
| 2016/0307013 | A1* | 10/2016 | Dagdelen Uysal | .. G06Q 10/087 |
| 2019/0197378 | A1 | 6/2019 | Garner | |

OTHER PUBLICATIONS

German citation for GE102020127586.2, Issued on May 20, 2021, Total of 1 page.

* cited by examiner

*Primary Examiner* — Tuyen K Vo
(74) *Attorney, Agent, or Firm* — Tracy M. Helms; Apex Juris, Pllc.

(57) ABSTRACT

A data reading device including a hangtag and a reader is provided. The hangtag includes a hangtag main body and a connection element including an RFID component, wherein the connection element passes through the hangtag main body, and two opposite ends with a first expansion and a second expansion abut against the surfaces of the hangtag main body. The reader includes a case, a reading head, and a circuit board. The case has a containing groove which has a groove shape corresponding to at least partial outer shape of the hangtag main body, the first expansion, and the second expansion. The reading head and the circuit board are set in the case, and electrically connected. When the hangtag with partial outer shape corresponding to the groove shape of the containing groove inserts in the containing groove, the RFID component corresponds to the reading head accurately to be connected rapidly.

9 Claims, 5 Drawing Sheets

READER AND DATA READING DEVICE

BACKGROUND OF THE INVENTION

1. Technical Field

The present invention relates generally to a near field communication equipment, and more particularly to a reader and data reading device.

2. Description of Related Art

Nowadays, the radio frequency identification (RFID) technology has been widely used by manufacturers, asset managers, and users. The system manufacturer who originally made RFID tags produces a large number of RFID tags, and then binds each RFID tag to the database. In detail, the RFID tag is placed on a reading panel on a workbench; after a reading head in the reading panel receives the digital packet transmitted back by the RFID tag, the RFID tag is bound to a specific data web page in a computer system. In this way, the manufacturers, asset managers, or users can store the information of the RFID tag or the information of the object to which the RFID tag is attached in the specific data web page for subsequent applications.

The system manufacturer is currently committed to producing a metal RFID hangtag. During the process of binding to the database, the RFID component on the hangtag needs to be aligned to the reading head on the workbench at a specific angle so that the reading head will not be covered by the metal shell of the hangtag when sending and receiving signals. However, the operator must keep holding the hangtag to correspond the RFID component to the reading head of the reading panel until the binding is completed. Such operation not only causes the burden on the operators for application, but also affects the work efficiency. Therefore, there is a need for further improvement.

BRIEF SUMMARY OF THE INVENTION

In view of the above, the primary objective of the present invention is to improve the stability of receiving the signal emitted by the RFID component on the hangtag.

The present invention provides a reader for reading an RFID component of a hangtag, wherein the hangtag includes a hangtag main body, a connection element, and the RFID component; the hangtag main body has a first surface and a second surface, which are opposite to each other, and a perforation; the perforation passes through the first surface and the second surface; the connection element has a first expansion, a second expansion, and a neck connecting the first expansion and the second expansion; the first expansion and the second expansion abut against the first surface and the second surface respectively, wherein the first expansion has a containing hole; the neck is located in the perforation, and an outer diameter of the neck is smaller than outer diameters of the first expansion and the second expansion; the RFID component is set in the containing hole. The reader includes a case, a reading head, and a circuit board. The case has a containing groove; the containing groove has a main positioning section, and a first auxiliary positioning section and a second auxiliary positioning section, which are located on two side walls of the main positioning section; the main positioning section communicates with the first auxiliary positioning section and the second auxiliary positioning section; a groove shape of the main positioning section corresponds to at least partial outer shape of the hangtag main body; a groove shape of the first auxiliary positioning section corresponds to at least partial outer shape of the first expansion, and a groove shape of the second auxiliary positioning section corresponds to at least partial outer shape of the second expansion; the reading head is set in the case and corresponds to the first auxiliary positioning section of the containing groove; the circuit board is set in the case and electrically connected to the reading head. Thereby, when the hangtag is located in the containing groove, the hangtag main body is located in the main positioning section, and a part of the first expansion is located in the first auxiliary positioning section, while a part of the second expansion is located in the second auxiliary positioning section; the RFID component corresponds to the reading head so that the reading head and the RFID component are connected in signal.

The present invention further provides a data reading device including a hangtag and a reader. The hangtag includes a hangtag main body, a connection element, and an RFID component; the connection element passes through and is provided on the hangtag main body; the connection element has a first expansion and a second expansion, wherein the first expansion and the second expansion respectively abut against two surfaces of the hangtag main body, which face each other; the RFID component is located on a top edge of the first expansion, and partially exposed outside the first expansion. The reader includes a case, a reading head, and a circuit board, wherein the case has a containing groove; the containing groove has a main positioning section and a first auxiliary positioning section and a second auxiliary positioning section, which are located on two side walls of the main positioning section; the main positioning section communicates with the first auxiliary positioning section and the second auxiliary positioning section; a groove shape of the main positioning section corresponds to at least partial outer shape of the hangtag main body; a groove shape of the first auxiliary positioning section corresponds to at least partial outer shape of the first expansion, and a groove shape of the second auxiliary positioning section corresponds to at least partial outer shape of the second expansion; the reading head is set in the case, and corresponds to the first auxiliary positioning section of the containing groove; the circuit board is set in the case, and electrically connected to the reading head. Thereby, when the hangtag is located in the containing groove, the hangtag main body is located in the main positioning section, and a part of the first expansion is located in the first auxiliary positioning section, while a part of the second expansion is located in the second auxiliary positioning section; the RFID component corresponds to the reading head so that the reading head and the RFID component are connected in signal.

The effect of the present invention is that when the hangtag inserts into the designed containing groove of the reader, the hangtag is firmly seated in the containing groove. Thus, the RFID component of the hangtag can be accurately connected to the reading head of the reader in signal, which helps to improve the stability of signal reception.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
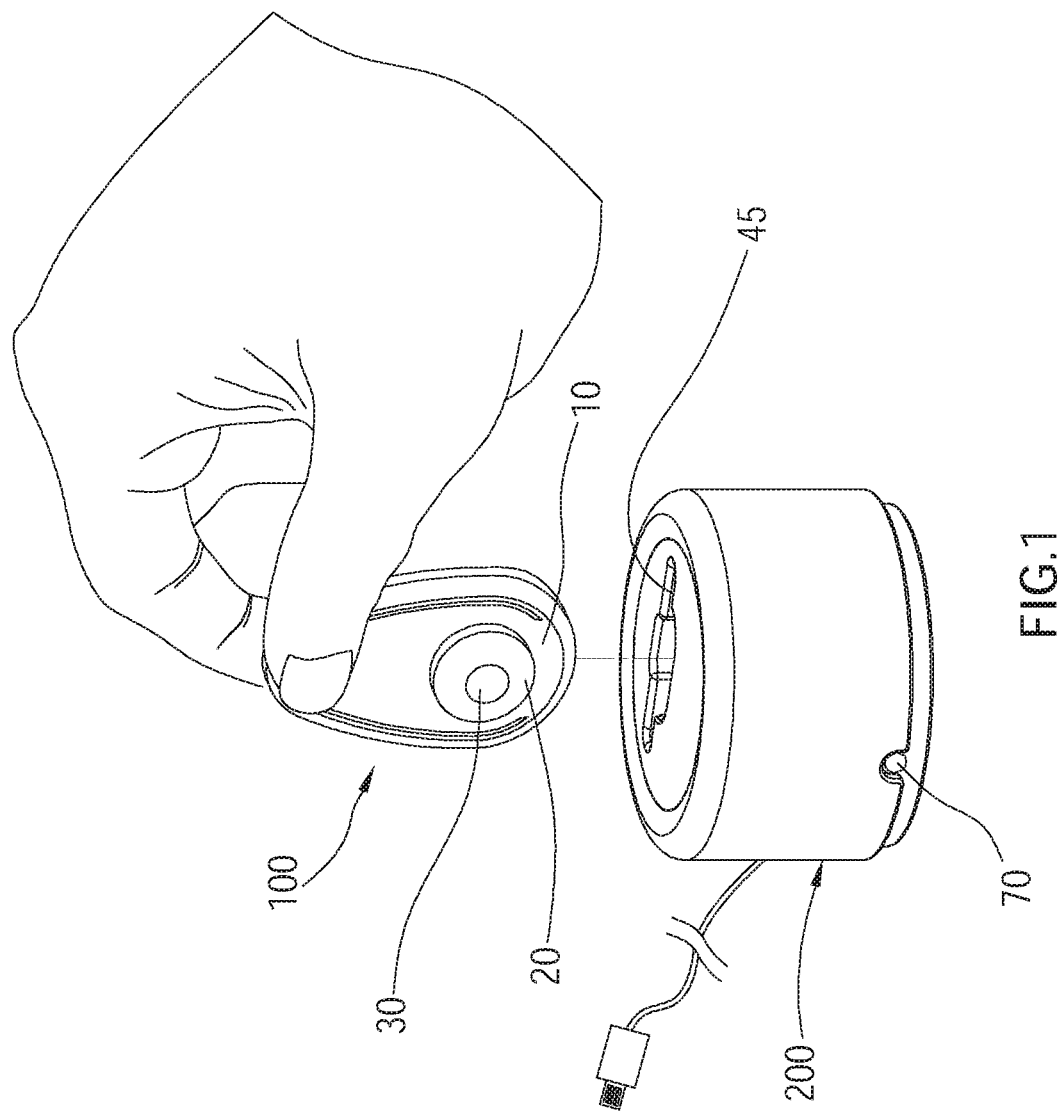
FIG. 1 is a schematic diagram of using the data reading device of the first embodiment of the present invention.
Figure 2:
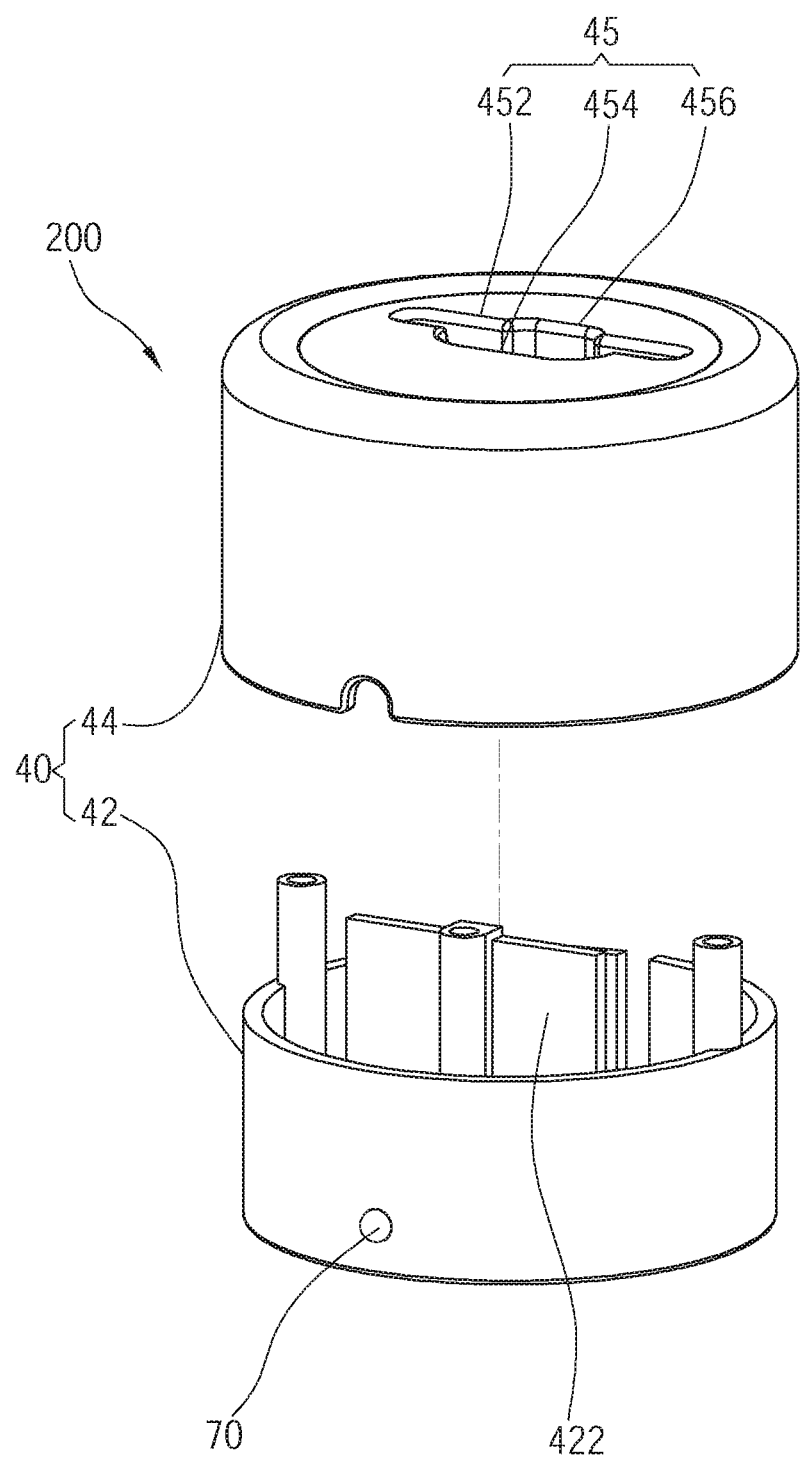
FIG. 2 is an exploded view of the reader of the first embodiment.

As shown in FIG. 1 to FIG. 4, a hangtag 100 and a reader 200 of a first embodiment of the present invention are provided.

The hangtag 100 includes a hangtag main body 10, a connection element, and an RFID component 30. The hangtag main body 10 has a first surface 10a and a second surface 10b, which are opposite to each other, and a perforation 10c, wherein the perforation 10c passes through the first surface 10a and the second surface 10b.

The connection element is a rivet 20 made of metal for connecting the hangtag main body 10 and the RFID component 30. The rivet 20 has a head and a body connected to the head, wherein the outer diameter of the body is smaller than the outer diameter of the head. After the body of the rivet 20 passes through the perforation 10c from the first surface 10a, the head of the rivet 20 abuts against the first surface 10a of the hangtag main body. Next, the body exposed outside the perforation 10c is squeezed by a punching device (not shown) and thus deformed and expands in the radial direction to touch the second surface 10b of the hangtag main body 10. The head and the squeezed and deformed part of the body respectively constitute a first expansion 22 and a second expansion 24 in this embodiment; the part of the body that is located in the perforation 10c without squeezed and deformed constitutes a neck 26 in this embodiment. The top edge of the first expansion 22 is recessed to form a containing hole 22a.

The RFID component 30 includes a main body 32 and an electronic assembly 34 set in the main body 32. The main body 32 is stuffed in the containing hole 22a; the maximum width of the main body 32 is not greater than 10 mm, and the maximum height thereof is not greater than 10 mm as well. The main body 32 has a top section 321 and a bottom section 322, which are opposite to each other, and a middle section 323 connecting the top section 321 and the bottom section 322. The outer diameter of the main body 32 gradually expands from the free end surface of the top section 321 and the free end surface of the bottom section 322 to the middle section 323 respectively. Therefore, when the bottom section 322 of the main body 32 faces the containing hole 22a and is stuffed into the containing hole 22a, the middle section 323 of the main body 32 abuts against the hole wall of the containing hole 22a, so that the main body 32 is firmly located in the containing hole 22a rather than galling out easily. The main body 32 in this embodiment is made of plastic which includes but is not limited to nylon and engineering plastics.

The electronic assembly 34 is located in the top section 321 of the main body 32. When a near field communication chip of the electronic assembly 34 is triggered, it can transmit the information stored in the chip, or receive a signal and store the signal in the chip.

Figure 3:
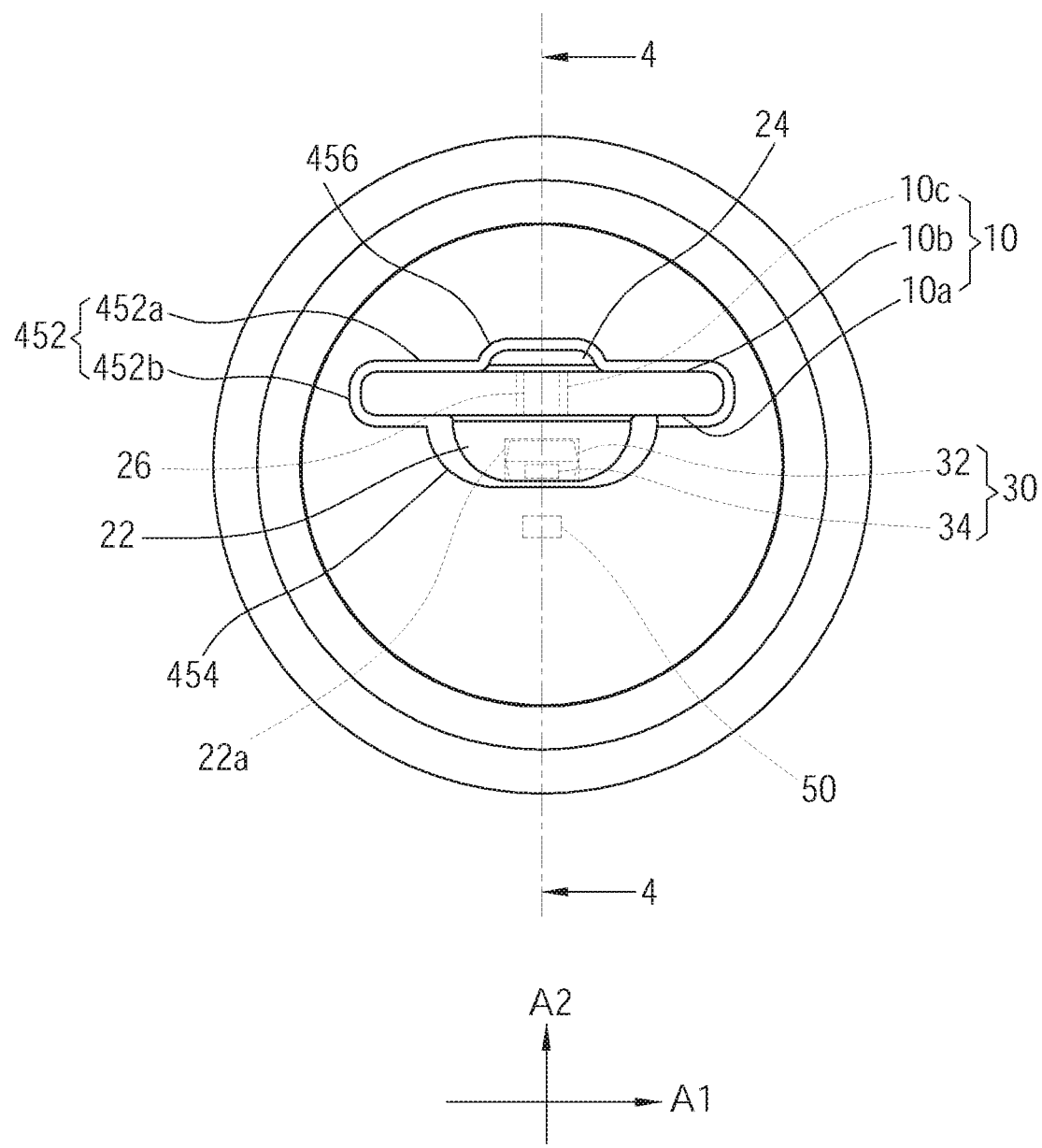
FIG. 3 is a top view of the reader in FIG. 2.
Figure 4:
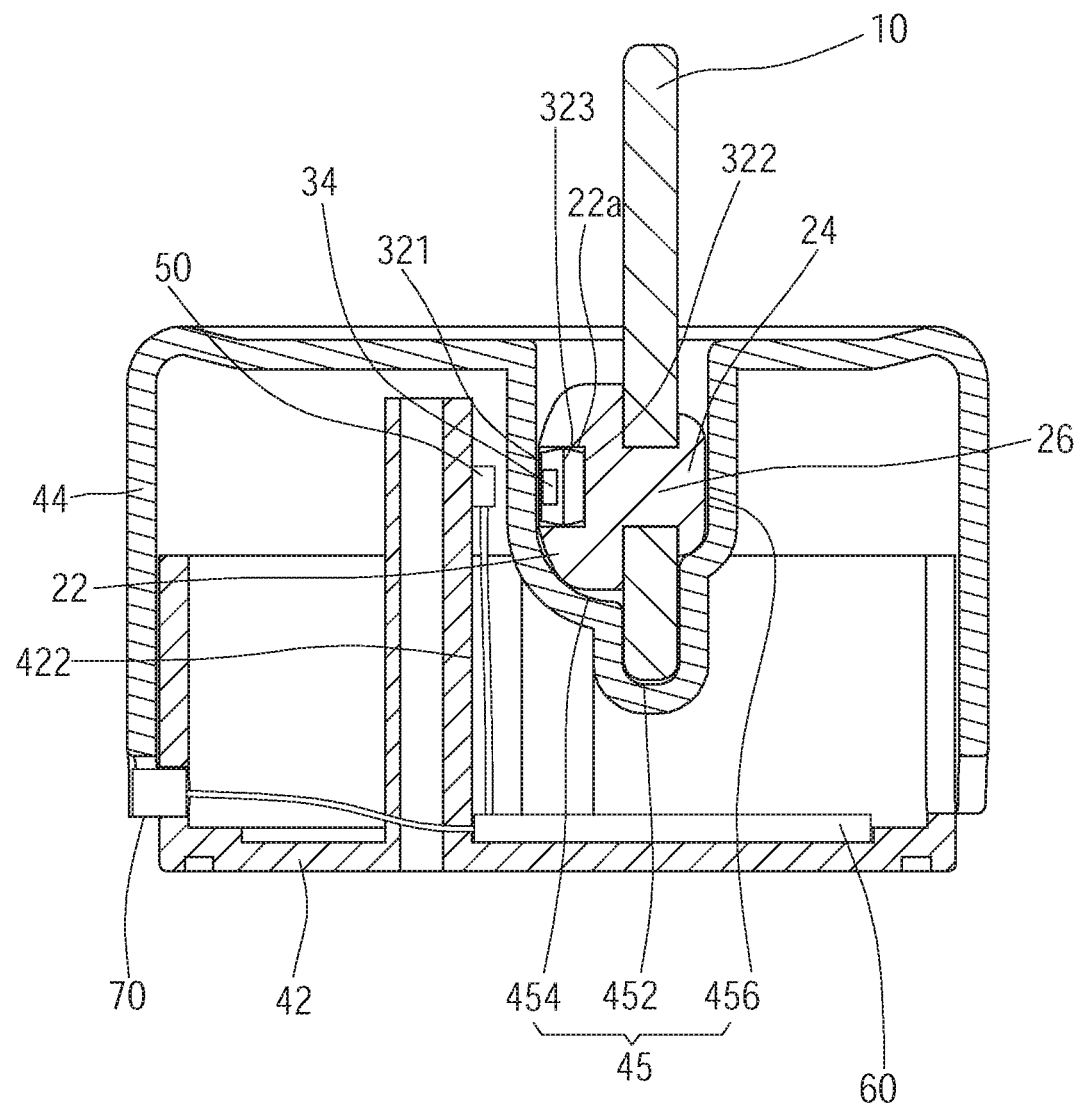
FIG. 4 is a sectional view along the 4-4 line in FIG. 3.

The reader 200 includes a case 40, a reading head 50, and a circuit board 60. The case 40 includes a base 42 and a shell 44, wherein the shell 44 is connected to and located on the base 42 and has a containing groove 45. As shown in FIG. 3 and FIG. 4, the containing groove 45 is recessed and formed from the upper surface of the shell 44, and the groove shape of the containing groove 45 is designed according to the partial outer shape of the hangtag 100. The containing groove 45 has a main positioning section 452, a first auxiliary positioning section 454, and a second auxiliary positioning section 456. The main positioning section 452 has two axes defined as a long axis A1 and a short axis A2. The main positioning section 452 has two long groove walls 452a on the long axis A1, which face each other, and two short groove walls 452b on the short axis A2, which face each other; each long groove wall 452a is adjacent to each short groove wall 452b. The first auxiliary positioning section 454 and the second auxiliary positioning section 456 are located on the two long groove walls 452a respectively, and communicate with the main positioning section 452.

Furthermore, the groove shape of the main positioning section 452 corresponds to at least partial outer shape of the hangtag main body 10; the groove shape of the first auxiliary positioning section 454 corresponds to at least partial outer shape of the first expansion 22, and the groove shape of the second auxiliary positioning section 456 corresponds to at least partial outer shape of the second expansion 24.

The reading head 50 is provided on a support wall 422 inside the case 40, and a signal sending endpoint of the reading head 50 faces the side wall of the first auxiliary positioning section 454. The circuit board 60 is located on the inner bottom surface of the base 42, and is electrically connected to the reading head 50 and an external computer system (not shown). When the reading head 50 is connected with the RFID component 30 in signal, the external computer system and the RFID component 30 can exchange data for subsequent applications.

The reader 200 further includes an indicator light 70 which is set on the case 40 and partly exposed outside the case 40, wherein the indicator light 70 is electrically connected to the circuit board 60. When the reading head 50 is connected with the RFID component 30 in signal, the indicator light 70 would light up, which helps to distinguish whether the RFID component 30 and the reading head 50 are connected in signal.

As shown in FIG. 4, when the hangtag 100 inserts into the containing groove 45, the hangtag main body 10 is located in the main positioning section 452, and the lower edge of the first expansion 22 abuts against the groove bottom of the first auxiliary positioning section 454, while the lower edge of the second expansion 24 abuts against the second auxiliary positioning section 456. Thus, the RFID component 30 will correspond to the signal sending endpoint of the reading head 50, so that the reading head 50 and the RFID component 30 can be accurately connected in signal to ensure the stability of the information exchange process. Thereby, users only need to insert the hangtag 100 into the containing groove 45 of the reader 200 to complete the positioning. Moreover, during the reading head 50 and the RFID component 30 are connected in signal, an exclusive data web page of the RFID component 30 is created in the external computer system. In this way, the initial process of establishing the database of the RFID component is more convenient.

Figure 5:
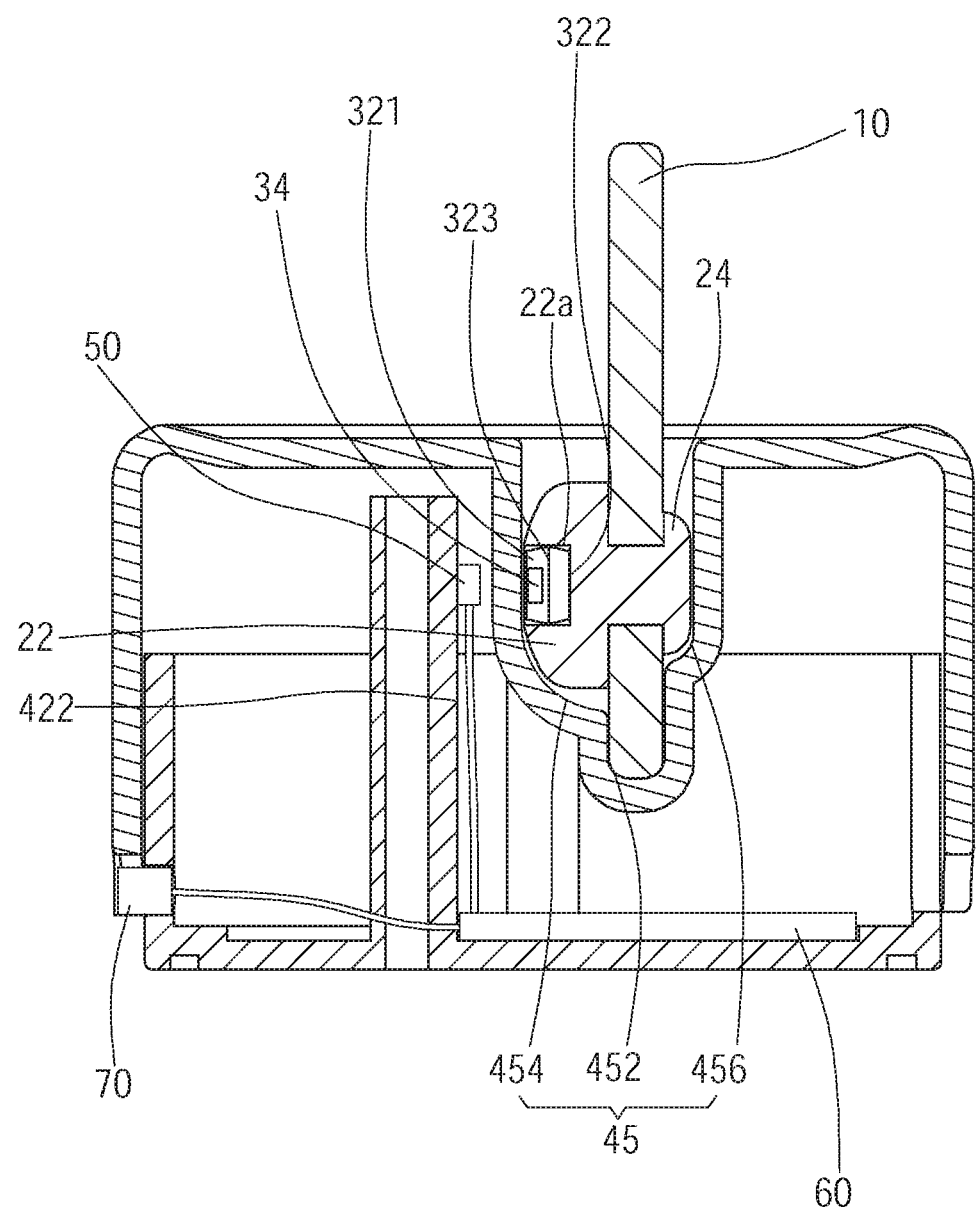
FIG. 5 is a sectional view of the data reading device of the second embodiment of the present invention.

Furthermore, the positioning of the hangtag 100 is not limited by abutting against the groove walls of the first auxiliary positioning section 454 and the second auxiliary positioning section 456. As shown in FIG. 5, in other practical applications, the hangtag main body 10 abuts against the groove bottom of the main positioning section 452 to complete the positioning, so that the RFID component 30 corresponds to the signal sending endpoint of the reading head 50. However, the way of positioning is not limited to the foregoing.

It must be noted that the embodiments described above are only preferred embodiments of the present invention. All equivalent structures which employ the concepts disclosed in this specification and the appended claims should fall within the scope of the present invention.

What is claimed is:

1. A reader for reading an RFID component of a hangtag, wherein the hangtag comprises a hangtag main body, a connection element, and the RFID component; the hangtag main body has a first surface and a second surface, which are opposite to each other, and a perforation; the perforation passes through the first surface and the second surface; the connection element has a first expansion, a second expansion, and a neck connecting the first expansion and the second expansion; the first expansion and the second expansion abut against the first surface and the second surface respectively, wherein the first expansion has a containing hole; the neck is located in the perforation, and an outer diameter of the neck is smaller than outer diameters of the first expansion and the second expansion; the RFID component is set in the containing hole; the reader comprises:
 a case having a containing groove, wherein the containing groove has a main positioning section and a first auxiliary positioning section and a second auxiliary positioning section, which are located on two side walls of the main positioning section; the main positioning section communicates with the first auxiliary positioning section and the second auxiliary positioning section; a groove shape of the main positioning section corresponds to at least partial outer shape of the hangtag main body; a groove shape of the first auxiliary positioning section corresponds to at least partial outer shape of the first expansion, and a groove shape of the second auxiliary positioning section corresponds to at least partial outer shape of the second expansion;
 a reading head which is set in the case and corresponds to the first auxiliary positioning section of the containing groove; and
 a circuit board which is set in the case and electrically connected to the reading head;
 thereby, when the hangtag is located in the containing groove, the hangtag main body is located in the main positioning section, and a part of the first expansion is located in the first auxiliary positioning section, while a part of the second expansion is located in the second auxiliary positioning section; the RFID component corresponds to the reading head so that the reading head and the RFID component are connected in signal.

2. The reader of claim 1, wherein the main positioning section has two axes defined as a long axis and a short axis; the main positioning section has two long groove walls on the long axis, which face each other, and two short groove walls on the short axis, which face each other; each of the long groove walls is adjacent to each of the short groove walls; the first auxiliary positioning section and the second auxiliary positioning section are located on the two long groove walls respectively; the two long groove walls are the two side walls of the main positioning section.

3. The reader of claim 1, wherein the main positioning section has a groove bottom; when the hangtag main body abuts against the groove bottom, the RFID component corresponds to a signal sending endpoint of the reading head.

4. The reader of claim 1, wherein the first auxiliary positioning section has a groove bottom; when the first expansion abuts against the groove bottom, the RFID component corresponds to a signal sending endpoint of the reading head.

5. A data reading device, comprising:
 a hangtag comprising a hangtag main body, a connection element, and an RFID component, wherein the connection element passes through and is provided on the hangtag main body; the connection element has a first expansion and a second expansion, wherein the first expansion and the second expansion respectively abut against two surfaces of the hangtag main body, which face each other; the RFID component is located on a top edge of the first expansion, and partially exposed outside the first expansion;
 a reader comprising a case, a reading head, and a circuit board, wherein the case has a containing groove; the containing groove has a main positioning section and a first auxiliary positioning section and a second auxiliary positioning section, which are located on two side walls of the main positioning section; the main positioning section communicates with the first auxiliary positioning section and the second auxiliary positioning section; a groove shape of the main positioning section corresponds to at least partial outer shape of the hangtag main body; a groove shape of the first auxiliary positioning section corresponds to at least partial outer shape of the first expansion, and a groove shape of the second auxiliary positioning section corresponds to at least partial outer shape of the second expansion; the reading head is set in the case, and corresponds to the first auxiliary positioning section of the containing groove; the circuit board is set in the case, and electrically connected to the reading head;
 thereby, when the hangtag is located in the containing groove, the hangtag main body is located in the main positioning section, and a part of the first expansion is located in the first auxiliary positioning section, while a part of the second expansion is located in the second auxiliary positioning section; the RFID component corresponds to the reading head so that the reading head and the RFID component are connected in signal.

6. The data reading device of claim 5, wherein the hangtag main body has a first surface and a second surface, which are opposite to each other, and a perforation; the perforation passes through the first surface and the second surface; the connection element has a neck which is located in the perforation and connects the first expansion and the second expansion with two ends thereof; an outer diameter of the neck is smaller than outer diameters of the first expansion and the second expansion; the first expansion has a containing hole; the RFID component is set in the containing hole.

7. The data reading device of claim 5, wherein the main positioning section has two axes defined as a long axis and a short axis; the main positioning section has two long groove walls on the long axis, which face each other, and two short groove walls on the short axis, which face each other; each of the long groove walls is adjacent to each of the short groove walls; the first auxiliary positioning section and the second auxiliary positioning section are located on the two long groove walls respectively; the two long groove walls are the two side walls of the main positioning section.

8. The data reading device of claim 5, wherein the RFID component comprises a main body and an electronic assembly; a maximum width of the main body is not greater than 10 mm, and the maximum height thereof is not greater than 10 mm; the electronic assembly is set in the main body, and has a near field communication chip.

9. The data reading device of claim 8, wherein the main body has a top section and a bottom section, which are opposite to each other, and a middle section connecting the top section and the bottom section; an outer diameter of the main body gradually expands from a free end surface of the top section and a free end surface of the bottom section to the middle section respectively; when the main body is set in the containing hole, the middle section of the main body abuts against a hole wall of the containing hole.

\* \* \* \* \*